(12) United States Patent
Takai et al.

(10) Patent No.: US 6,479,559 B1
(45) Date of Patent: Nov. 12, 2002

(54) CHLORINATED VINYL CHLORIDE RESIN COMPOSITION FOR SIDING EXTRUSION MOLDING AND SIDING MOLDED ARTICLE USING THE SAME

(75) Inventors: Atsushi Takai, Kobe (JP); Toshio Okuhara, Houston, TX (US); Kazumasa Yamane, Kakogawa (JP)

(73) Assignee: Kaneka Corporation, Osaka (JP)

(*) Notice: Subject to any disclaimer, the term of this patent is extended or adjusted under 35 U.S.C. 154(b) by 0 days.

(21) Appl. No.: 10/082,138

(22) Filed: Feb. 26, 2002

Related U.S. Application Data

(63) Continuation-in-part of application No. 10/028,923, filed on Dec. 28, 2001.

(30) Foreign Application Priority Data

Jan. 22, 2001 (JP) ........................................ 2001-013808
May 10, 2001 (JP) ........................................ 2001-140542

(51) Int. Cl.$^7$ .............................. C08J 9/236; C08J 9/32; C08J 9/35
(52) U.S. Cl. .......................... 521/54; 521/134; 521/145; 521/150

(58) Field of Search .......................... 521/54, 150, 134, 521/145

(56) References Cited

FOREIGN PATENT DOCUMENTS

| | | |
|---|---|---|
| JP | 2001-323033 | 11/2001 |
| WO | WO 00/02963 | 1/2000 |
| WO | WO 01/30908 | 5/2001 |

*Primary Examiner*—Morton Foelak
(74) *Attorney, Agent, or Firm*—Armstrong, Westerman & Hattori, LLP

(57) ABSTRACT

There is obtained a chlorinated vinyl chloride resin composition from which a siding molded article having good appearance and excellent heat resistance, impact resistance and weatherability is obtained. A chlorinated vinyl chloride resin composition for siding extrusion molding is obtained and a siding molded article is prepared therefrom, said chlorinated vinyl chloride resin composition comprising 100 parts by weight of a chlorinated vinyl chloride resin and 3 to 20 parts by weight of an acrylic graft rubber copolymer, wherein the acrylic graft rubber copolymer contains 30 to 90% by weight of acrylic hollow rubber particles whose average void ratio is 3 to 90% by volume in a latex state.

6 Claims, No Drawings

CHLORINATED VINYL CHLORIDE RESIN COMPOSITION FOR SIDING EXTRUSION MOLDING AND SIDING MOLDED ARTICLE USING THE SAME

CROSS-REFERENCE TO RELATED APPLICATION

This is a continuation-in-part of application Ser. No. 10/028,923 filed on Dec. 28, 2001 pending.

BACKGROUND OF THE INVENTION

The present invention relates to a chlorinated vinyl chloride resin composition for siding extrusion molding and a siding molded article using the same. More particularly, the present invention relates to a chlorinated vinyl chloride resin composition from which a siding molded article excellent in appearance, heat resistance, impact resistance and weatherability can be obtained, and a siding molded article obtained by using the same.

Vinyl chloride resins are excellent in processibility and mechanical properties and available at moderate prices. Therefore, those resins are used in a wide variety of fields including housing industry where the resin is processed into a molded article such as a window frame or a siding molded article such as a siding sheet.

Weatherability is required for siding molded articles since they are used outdoors for a long time. In view of this, siding molded articles are generally made to have a two-layered structure and the surface layer which is exposed to sunlight is made of a material having excellent weatherability to prevent discoloration and other harmful effects.

Such a two-layered structure molded article has a surface layer called "capstock" and an inner layer called "substrate". The composite can be prepared by a method such as coextrusion. A ratio of a thickness of the capstock to that of the substrate is usually about 25/75 to 10/90.

While materials other than a vinyl chloride resin having greatly improved discoloration resistance against weather are used for the capstock, a vinyl chloride resin is generally used for the substrate.

Furthermore, required properties other than weatherability are impact resistance in a temperature range at which a siding molded article is used, and heat resistance such that the molded article is hardly deformed when surface temperature is increased by sunlight. Since these properties greatly depend upon the substrate constituting major portion of a molded article, selection of a composition for the substrate becomes important.

A vinyl chloride resin generally used for the substrate does not have sufficient impact resistance only by compounding a lubricant or a stabilizer. However, it is known that desirable impact resistance can be obtained by compounding an impact resistance modifier such as a butadiene rubber or an acrylic rubber.

Furthermore, since heat deformation temperature of a vinyl chloride resin is in a range of about 60° to 70° C., such a vinyl chloride resin is suitable for the substrate of a light tone siding molded article whose surface temperature does not exceed 70° C.

However, in the case of a siding molded article having dark color tone such as dark green, navy blue and brown, surface temperature thereof may reach at least 70° C. For this reason, a vinyl chloride resin composition having relatively low heat resistance is not suitable for the substrate of the dark-color siding molded article.

On the other hand, a chlorinated vinyl chloride resin obtained by chlorinating a vinyl chloride resin is known as a relatively inexpensive, general-purpose resin and has the characteristic that heat deformation temperature thereof is higher by 20° to 40° C. than that of a vinyl chloride resin. With putting this property into good use, the chlorinated vinyl chloride resin is used for a hot-water pipe or a heat resistant plate for industrial use. It is predicted that a dark-color siding molded article having desired heat resistance can be obtained by using a chlorinated vinyl chloride resin for a siding molded article.

By the way, impact resistance at low temperature of a chlorinated vinyl chloride resin is smaller than that of a vinyl chloride resin. Therefore, when a chlorinated vinyl chloride resin is used as a substrate, it is difficult to obtain a siding molded article having desired impact resistance. Since a siding molded article is also used as an external wall of houses, it goes without saying that impact resistance at low temperature is required.

Furthermore, it is generally said that a chlorinated vinyl chloride resin is difficult to process since it has inferior heat stability and higher melt viscosity compared to those of a vinyl chloride resin. For example, when a chlorinated vinyl chloride resin composition is extrusion-molded, die pressure and extrusion torque for an extrusion molding machine may be raised. In addition, a molded article is colored and deteriorated in appearance, burn mark being generated during extrusion molding. Thus, desirable molded articles can not be obtained in some cases.

Other various resins have similar problems, which means that a resin has not been found yet, which has properties required for a dark-color siding molded article, that is, good appearance, excellent weatherability, heat resistance, impact resistance and processibility as well as economical efficiency.

The present invention was carried out in order to solve the above problems in prior arts. An object of the present invention is to provide a chlorinated vinyl chloride resin composition for siding extrusion molding which can provide a siding molded article having excellent processibility, good appearance, excellent heat resistance, impact resistance and weatherability, and to provide a siding molded article using the same.

SUMMARY OF THE INVENTION

Intense studies were conducted to solve the above problems. As a result, the present invention has been completed based on the findings that it is possible to obtain a chlorinated vinyl chloride resin composition for siding extrusion molding which can provide a siding molded article having excellent appearance, desirable weatherability, heat resistance and impact resistance without losing processibility by preparing a siding molded article using a particular chlorinated vinyl chloride resin composition.

That is, the present invention relates to a chlorinated vinyl chloride resin composition for siding extrusion molding, comprising 100 parts by weight of a chlorinated vinyl chloride resin and 3 to 20 parts by weight of an acrylic graft rubber copolymer, wherein the acrylic graft rubber copolymer contains 30 to 90% by weight of acrylic hollow rubber particles whose average void ratio is 3 to 90% by volume in a latex state.

It is preferable that the chlorinated vinyl chloride resin composition further comprises at least two tin stabilizers.

It is also preferable that the chlorinated vinyl chloride resin composition further comprises oxidation-type modified polyethylene wax having an acid number of 0.1 to 10 mg/g measured by JIS K 5902 as a lubricant.

In addition, it is preferable that the chlorinated vinyl chloride resin composition further comprises a dark-color pigment.

The present invention also relates to a siding molded article obtained by using the above chlorinated vinyl chloride resin composition for siding extrusion molding.

Preferably, the above siding molded article has Gardner strength of at least 0.68 m·kg/mm (1.5 inch·lbs/mil) at 23° C. and HDT of at least 87.7° C. (190° F.).

DETAILED DESCRIPTION

The chlorinated vinyl chloride resin composition of the present invention comprises, as a base resin, a chlorinated vinyl chloride resin having excellent heat resistance, and an acrylic graft rubber copolymer containing 30 to 90% by weight of acrylic hollow rubber particles whose average void ratio is 3 to 90% by volume in a latex state, for improving weatherability and impact resistance of a molded article. If necessary, the chlorinated vinyl chloride resin composition of the present invention further comprises at least two kinds of tin stabilizers, at least one kind of oxidation-type modified polyethylene wax (lubricant) having an acid number of 0.1 to 10 mg/g measured by JIS K5902, and at least one kind of a dark-color pigment.

As described above, since a chlorinated vinyl chloride resin is used as a base resin, the composition has excellent heat resistance and may be also used for a substrate of a dark-color siding molded article. In addition, since an acrylic graft rubber copolymer containing 30 to 90% by weight of acrylic hollow rubber particles having a glass transition temperature (Tg) of at most 0° C. and an average void ratio of 3 to 90% by volume in a latex state is used, impact resistance can be improved and a siding molded article having excellent weatherability can be obtained even when a siding molded article is prepared by using a chlorinated vinyl chloride resin as a base resin. In addition, when at least two tin stabilizers are used, heat stability at extrusion processing can be improved, and such a problem that burn mark is generated at extrusion molding is prevented. Further, when the above oxidation-type modified polyethylene wax is used, extrusion processability can be improved by decreasing melt viscosity. When a dark-color pigment is used, it becomes possible to prepare dark-color molded articles whose use had been limited from the viewpoint of heat resistance, and a wider range of designs becomes available.

The above chlorinated vinyl chloride resin is prepared by chlorinating a vinyl chloride resin.

Examples of the vinyl chloride resin include a homopolymer of a vinyl chloride monomer, and a copolymer of a vinyl chloride monomer and a monomer copolymerizable therewith such as ethylene, propylene, vinyl acetate, vinyl chloride, allyl chloride, allyl glycidyl ether, acrylate ester or vinyl ether.

An average degree of polymerization of the vinyl chloride resin before chlorination is usually 500 to 1,300, preferably 500 to 1,200, more preferably 600 to 900 from the viewpoint of balance between mechanical strength and processability.

As a method of chlorinating a vinyl chloride resin as a raw material, there are known a method of supplying chlorine to a vinyl chloride resin suspended in water to chlorinate the same by irradiation with a mercury lamp, a method of chlorination by heating, a method of chlorination in the presence of a catalyst such as a peroxide, a method of chlorination by irradiation with a mercury lamp in a chlorine gas stream, and the like.

The chlorinated vinyl chloride resin used in the present invention may be a resin obtained by any of these methods. The chlorination degree of the chlorinated vinyl chloride resin is usually 62 to 70% from the viewpoint of balance between heat resistance and melt viscosity.

Examples of the above chlorinated vinyl chloride resin include, but are not limited to, heat resistant Kanevinyl H727 (average polymerization degree: 700, chlorination degree: 67%, available from Kaneka Corporation), heat resistant Kanevinyl H827 (average polymerization degree: 700, chlorination degree: 68%, available from Kaneka Corporation), and the like. These may be used alone or in combination of two or more. Among them, heat resistant Kanevinyl H727 is preferable from the viewpoint of balance among heat resistance, processibility and mechanical properties.

In the present invention, the above acrylic graft rubber copolymer used together with the chlorinated vinyl chloride resin is an acrylic graft rubber copolymer containing 30 to 90% by weight of acrylic hollow rubber particles whose glass transition temperature(Tg) is at most 0° C. and void ratio is 3 to 90% by volume in a latex state.

In order to improve weatherability, the above acrylic hollow rubber particles comprises 80 to 100% by weight, preferably 85 to 100% by weight of an acrylic monomer unit, and 0 to 20% by weight, preferably 0 to 15% by weight of a monomer unit copolymerizable with the acrylic monomer. When the ratio of the acrylic monomer is less than 80% by weight, impact resistance and weatherability of a molded article is easily lowered. When hollow rubber particles obtained from a butadiene polymer are used, weatherability of a molded article is deteriorated.

Examples of the above acrylic polymer include butyl acrylate rubber, butadiene-butyl acrylate rubber, 2-ethylhexyl-acrylate-butyl acrylate rubber, 2-ethylhexyl-methacrylate-butyl acrylate rubber, dimethylsiloxane-butyl acrylate rubber, a composite rubber of silicone rubber and butyl acrylate rubber and the like.

The above acrylic polymer has a glass transition temperature (Tg) of at most 0° C., preferably −20° to −40° C. from the viewpoint of impact resistance.

Further, the average void ratio of the above hollow rubber particles in a latex state is 3 to 90% by volume, preferably 10 to 60% by volume, more preferably 40 to 60% by volume. When the average void ratio is less than 3% by volume, improving effect on impact resistance is not sufficiently imparted. On the other hand, when the ratio is more than 90% by volume, hollow rubber particles may break at molding and impact strength cannot be improved stably.

The average void ratio of the above hollow rubber particles can be measured by the following method.

That is, the average void ratio can be measured by staining the particles with ruthenium tetraoxide and observing the same according to TEM after hollow rubber particles present in a latex state are embedded with an epoxy resin or the like. Alternatively, the average void ratio can be calculated by accurately measuring each diameter of rubber particles in the latex using microtrack UPA or the like and then measuring light scattering strength of the same rubber latex.

The average particle diameter of the hollow rubber particles is generally 0.03 to 2.0 $\mu$m, preferably 0.03 to 0.5 $\mu$m, more preferably 0.05 to 0.3 $\mu$m from the viewpoint of improvement on impact strength and polymerization stability of hollow rubber particles.

The hollow rubber particles may be formed of a single layer or at least two layers. It is preferable that hollow rubber particles are prepared by forming a seed and then grafting the seed with a monomer copolymerizable therewith from the viewpoint that polymerization of rubber particles is stable and uniform rubber particles can be obtained.

As the graft monomer component to be grafted with the above hollow rubber particles, there is used a component comprising 50 to 100% by weight, preferably 60 to 100% by weight of methyl methacrylate, 0 to 50% by weight, preferably 0 to 40% by weight of alkyl methacrylate having 2 to 8 carbon atoms in the alkyl group and/or alkyl acrylate having 1 to 8 carbon atoms in the alkyl group and 0 to 25% by weight of acrylonitrile from the viewpoint of processibility and compatibility with a chlorinated vinyl chloride resin. Examples of the preferable graft monomer component include a component comprising 60 to 100% by weight of methyl methacrylate and 0 to 40% by weight of alkyl methacrylate having 2 to 8 carbon atoms in the alkyl group and/or alkyl acrylate having 1 to 8 carbon atoms in the alkyl group. Particularly preferable is a component comprising 100% by weight of methyl methacrylate.

The graft ratio of the graft monomer component to the above hollow rubber particles is 30 to 90% by weight, preferably 70 to 90% by weight of hollow rubber particles in the acrylic graft rubber copolymer from the viewpoint of impact resistance.

The average particle diameter of the above acrylic graft rubber copolymer is usually 0.033 to 2.2 μm, preferably 0.033 to 0.55 μm, more preferably 0.055 to 0.33 μm.

As a method of preparing the above acrylic graft rubber copolymer, various methods are known. For example, the copolymer can be prepared by a method described in WO 00/02963 pamphlet.

The amount of the above acrylic graft rubber copolymer is 3 to 20 parts by weight, preferably 4 to 12 parts by weight based on 100 parts by weight of a chlorinated vinyl chloride resin. When the amount is less than 3 parts by weight, impact resistance is not sufficiently improved. When the amount is more than 20 parts by weight, heat resistance, an original property in case of using a chlorinated vinyl chloride resin as a base resin, becomes insufficient.

In order to improve heat stability at extrusion processing, a stabilizer, a lubricant and a dark-color pigment may be added to the chlorinated vinyl chloride resin composition of the present invention comprising a chlorinated vinyl chloride resin and an acrylic graft rubber copolymer.

As the above stabilizer, a tin stabilizer is preferable from the viewpoint of improvement on heat stability and low toxicity.

Examples of the tin stabilizer include alkyltin such as methyltin, butyltin or octyltin, dialkyltin dicarboxylate such as butyltin propionate, alkyltin mercaptide such as methyltin mercaptide, butyltin mercaptide or octyltin mercaptide, alkyltin maleate ester such as butyltin maleate ester or octyltin maleate ester, alkyltin maleate polymer such as butyltin maleate polymer or octyltin maleate polymer, alkyltin mercaptocarboxylate such as butyltin mercaptopropionate, dialkyltin bis (alkylmercaptocarboxylate), and di-n-octyltin-S,S'-bis (isooctylmercaptoacetate). These may be used alone or in combination of two or more. However, it is preferable to use at least two kinds of tin stabilizers selected from the above in combination since extremely excellent heat stability effects can be obtained and problems of coloration and generation of burn mark at extrusion molding are greatly prevented.

When at least two kinds of tin stabilizers selected from the above tin stabilizers are used in combination, specific examples of the combination include a combination of 3 parts by weight of alkyltin mercaptide such as butyltin mercaptide and 0.3 to 0.7 part by weight of alkyltin mercaptocarboxylate such as butyltin mercaptopropionate, and a combination of 3 parts by weight of alkyltin mercaptide such as octyltin mercaptide and 0.3 to 0.7 part by weight of alkyltin maleate ester such as butyltin maleate ester.

The amount of the above tin stabilizer is preferably 1 to 5 parts by weight based on 100 parts by weight of a chlorinated vinyl chloride resin. In order to improve heat stability of the chlorinated vinyl chloride resin, the amount of the tin stabilizer is preferably at least 1 part by weight. However, when the amount is more than 5 parts by weight, heat stability effect reaches a state of saturation.

As the lubricant, at least one kind of generally used lubricants, for example, di- or trioleate of polyglycerol, polyethylene wax, oxidized polyethylene and high molecular paraffin wax can be used without particular limitation. A preferable lubricant is polyethylene wax from the viewpoint of higher lubricating property.

As to the polyethylene wax, it is preferable to use oxidation-type modified polyethylene wax having an acid number of 0.1 to 10 mg/g measured by JIS K5902. When the acid number is adjusted to at least 0.1 mg/g, compatibility with the chlorinated vinyl chloride resin is improved and then desirable products can be obtained by kneading. In addition, when the acid number is adjusted to at most 10 mg/g, sliding of a chlorinated vinyl chloride resin through the metal face of a mold is improved, molded articles becomes glossy and burn mark is not formed. In addition, use of such oxidation-type modified polyethylene wax improves impact strength of a molded article. A preferable acid number is 0.5 to 5 mg/g.

The amount of the above lubricant is preferably 1.5 to 4 parts by weight based on 100 parts by weight of a chlorinated vinyl chloride resin. In order to decrease melt viscosity to improve extrusion processibility, the amount of the lubricant is preferably at least 1.5 parts by weight. In order to avoid pulsation caused by resin discharge at extrusion processing, the amount of the lubricant is preferably at most 4 parts by weight.

As the above dark-color pigment, pigments conventionally used can be employed.

It is preferable that the amount of the above dark-color pigment is 0.01 to 1 part based on 100 parts by weight of a chlorinated vinyl chloride resin.

Even when a dark-color pigment is added to the chlorinated vinyl chloride resin composition of the present invention, processibility, heat resistance and impact resistance are not deteriorated. Therefore, there can be obtained a dark-color siding molded article which was impossible to obtain according to prior arts.

To the chlorinated vinyl chloride resin composition of the present invention mentioned above may be added a filler such as titanium dioxide or calcium carbonate, an appropriate processibility improving agent and a coloring agent such as a non-dark-color pigment which are usually used in extrusion processing of a chlorinated vinyl chloride resin, in addition to the above components.

The chlorinated vinyl chloride resin composition of the present invention can be molded by conventional siding extrusion. For example, the composition and other resin compositions are coextruded at the same time using a conventional twin-screw extruder, and any embossing roll, draw-off roll or former may be used to obtain a desired siding molded article, for example, a housing siding sheet having or not having a dark color.

In this way, it is possible to obtain a siding molded article having Gardner strength of at least 0.68 m·kg/mm (1.5 inch·lbs/mil) at 23° C. and HDT of at least 87.7° C. (190° F.), which was impossible to obtain according to prior arts.

EXAMPLE

Hereinafter the present invention is explained in more detail by means of the following Examples, but the present invention is not limited thereto. "Part" and "%" in Examples mean "part by weight" and "% by weight", respectively, unless otherwise specified.

The average void ratio in Examples was evaluated according to the following method.
(Average Void Ratio)

The average void ratio was calculated by measuring each diameter of particles in the rubber latex by microtrack UPA and measuring light scatter of the rubber latex.

Example 1

After mixing 200 parts of water with 4 parts of sodium oleate, the mixture was heated to 70° C. Nitrogen replacement was performed when the solution temperature reached 70° C. Thereafter, a solution mixture comprising 5. parts of butyl acrylate, 5 parts of styrene and 3 parts of t-dodecylmercaptan was added thereto. After 30 minutes, 0.5 part (solids) of a 2% aqueous solution of potassium persulfate was added thereto and polymerization was carried out for 1 hour. Subsequently, a solution mixture comprising 45 parts of butyl acrylate, 45 parts of styrene and 27 parts of t-dodecyl mercaptan was continuously added over 3 hours. Post-polymerization was carried out for two hours to obtain a seed latex (S-1) having an average particle diameter of 0.04 $\mu$m.

Two parts (solids) of the obtained seed latex (S-1) was mixed with 50 parts of water. The mixture was heated to 50° C. and nitrogen replacement was performed. Thereto was added 0.4 part (solids) of a 2% aqueous solution of potassium persulfate. Subsequently, a solution mixture comprising 98 parts of butyl acrylate, 0.3 part of allyl methacrylate, 0.75 part (solids) of a 5% aqueous solution of sodium laurylsulfate and 400 parts of water was finely dispersed by using a homogenizer to obtain an emulsion. The emulsion was continuously added to the above mixture over 6 hours. Thereafter, polymerization was performed for 2 hours to obtain an acrylic hollow rubber particle latex (R-1).

The obtained acrylic hollow rubber particle latex (R-1) contained water in particles and had an average void ratio of 50% by volume, glass transition temperature (Tg) of −34° C. and an average particle diameter of 0.16 $\mu$m.

The obtained acrylic hollow rubber particle latex (R-1) in an amount of 85 parts (solids) was heated to 45° C. Thereafter, 0.15 part (solids) of a 5% aqueous solution of sodium laurylsulfate, 0.0016 part of ferrous sulfate, 0.004 part of ethylene diamine tetraacetic acid disodium salt and 0.2 part of sodium formaldehydesulfoxylate were added thereto. Then, a solution mixture comprising 15 parts of methyl methacrylate and 0.01 part of cumene hydroperoxide was continuously added thereto over 1 hour. Post-polymerization was performed for 1 hour to obtain an acrylic graft rubber copolymer latex (G-1L) having an average particle diameter of 0.19 $\mu$m.

The obtained graft rubber copolymer latex (G-1L) was coagulated with calcium chloride, heat-treated, dehydrated and dried to obtain a powdery acrylic graft rubber copolymer (G-1).

To 100 parts of a chlorinated vinyl chloride resin (heat resistant Kanevinyl H727 available from Kaneka Corporation) having an average polymerization degree of 700 and a chlorination degree of 67% was added a mixture comprising 9 parts of the acrylic graft rubber copolymer (G-1) obtained according to the above process, 3 parts of butyltin mercaptide stabilizer, 0.5 part of a butyltin mercaptopropionate stabilizer, 1 part of oxidization-type modified polyethylene wax (Hiwax 220MP available from Mitsui Chemicals, Inc.) having an acid number of 1.0 mg/g, 1 part of polyethylene wax (AC629A available from Allied Signal Inc.) and 3.5 parts of titanium dioxide. The mixture was blended by using a Henschel mixer to obtain a uniform compound having a total weight of about 100 kg.

The obtained compound as a substrate and an acrylic resin (PMMA resin) as a capstock were coextruded by using a 100 mm parallel extruder to obtain a white siding sheet having a total thickness of about 1.2 mm (thickness of the substrate: about 1.0 mm; thickness of the capstock: about 0.2 mm).

The extrusion processibility was evaluated according to the criterion that the obtained siding sheet had or did not have surface gloss and burn line.

The obtained siding sheet was cut into a predetermined size and used as a sample for Gardner impact test at 23° C. according to ASTM D4226.

In addition, another siding sheet sample was subjected to a sunshine weatherability test at 63° C. under a condition including rainfall. Appearance was observed after 500 hours and evaluated according to the following criteria.

A: Discoloration degree is extremely small

B: Slightly discolored

C: Greatly discolored

Further, a sample having a predetermined size was made from the siding sheet, and subjected to an oil canning test at 65.6° C. according to ASTM D3679. In the oil canning test, a deformation degree of the sheet was visually observed to describe the result as "passed" when no deformation is observed and "not passed" when even only slight deformation is observed.

In addition, another siding sheet sample was pressed at a temperature of 200° C., and HDT measurement was performed according to ASTM D648.

The results are shown in Table 1.

Example 2

Molding was carried out to obtain a siding sheet in the same manner as in Example 1 except that the amount of the acrylic graft rubber copolymer (G-1) was changed to 6 parts. The obtained sheet was evaluated in the same manner as in Example 1. The result is shown in Table 1.

Example 3

Molding was carried out to obtain a siding sheet in the same manner as in Example 1 except that the kind and amount of stabilizers were changed to 3 parts of octyltin mercaptide stabilizer and 0.5 part of butyltin maleate stabilizer. The obtained sheet was evaluated in the same manner as in Example 1. The result is shown in Table 1.

Example 4

Molding was carried out to obtain a siding sheet in the same manner as in Example 1 except that the amount of oxidation-type modified polyethylene wax (Hiwax 220MP available from Mitsui Chemicals, Inc.) was changed to 1.5 parts. The obtained sheet was evaluated in the same manner as in Example 1. The result is shown in Table 1.

Example 5

Molding was carried out in the same manner as in Example 1 except that 0.6 part of a dark green pigment was added to the chlorinated vinyl chloride resin as the substrate and to the acrylic resin as the capstock, respectively. A dark-color siding sheet was obtained. The obtained siding sheet was evaluated in the same manner as in Example 1. The result is shown in Table 1.

Mitsui Chemicals, Inc.), 1 part of polyethylene wax (AC629A available from Allied Signal Inc.) and 3.5 parts of titanium dioxide. The mixture was blended by using a Henschel mixer to obtain a uniform compound having a total weight of about 100 kg.

Molding was carried out to obtain a siding sheet in the same manner as in Example 1 except that the compound obtained above was used as the substrate. The obtained siding sheet was evaluated in the same manner as in Example 1. The result is shown in Table 2.

TABLE 1

|  | Ex. no. | 1 | 2 | 3 | 4 | 5 |
|---|---|---|---|---|---|---|
| Composition of substrate (part) | H727 (part) | 100 | 100 | 100 | 100 | 100 |
|  | Copolymer (G-1) | 9 | 6 | 9 | 9 | 9 |
|  | Butyltin mercaptide stabilizer | 3 | 3 | — | 3 | 3 |
|  | Octyltin mercaptide stabilizer | — | — | 3 | — | — |
|  | Butyltin mercapto propionate stabilizer | 0.5 | 0.5 | — | 0.5 | 0.5 |
|  | Butyltin maleate stabilizer | — | — | 0.5 | — | — |
|  | Hiwax 220MP | 1 | 1 | 1 | 1.5 | 1 |
|  | AC629A (part) | 1 | 1 | 1 | 1 | 1 |
|  | Titanium dioxide | 3.5 | 3.5 | 3.5 | 3.5 | 3.5 |
|  | Dark-color pigment | — | — | — | — | 0.6 |
| Evaluation result | Appearance of siding sheet | excellent | excellent | excellent | excellent | excellent |
|  | Gardner impact test (m · kg/mm (inch · lbs/mil)) | 0.938 (2.07) | 0.734 (1.62) | 0.929 (2.05) | 0.662 (1.46) | 0.938 (2.07) |
|  | Sunshine weatherability test | A | A | A | A | A |
|  | Oil canning test | passed | passed | passed | passed | passed |
|  | HDT test (° C.(° F.)) | about 90.6 (195) | About 92.2 (198) | about 90.6 (195) | about 89.4 (193) | about 90.6 (195) |

Comparative Example 1

To 100 parts of a vinyl chloride resin (Kanevinyl S1001 available from Kaneka Corporation) having an average polymerization degree of 1,000 were added 6 parts of acrylic impact resistance modifier (Kaneace FM-10 available from Kaneka Corporation) as an impact modifier, 1 part of acrylic processing aid (Kaneace PA-10 available from Kaneka Corporation), 1 part of metyltin mercaptide stabilizer, 1 part of calcium stearate, 1 part of paraffin wax, 1 part of titanium dioxide and 10 parts of calcium carbonate. The mixture was blended by using a Henschel mixer to obtain a uniform compound having a total weight of about 100 kg.

Molding was carried out to obtain a siding sheet in the same manner as in Example 1 except that the compound obtained above was used as the substrate. The obtained siding sheet was evaluated in the same manner as in Example 1. The result is shown in Table 2.

Comparative Example 2

To 100 parts of a chlorinated vinyl chloride resin (heat resistant Kanevinyl H727 available from Kaneka Corporation) having an average polymerization degree of 700 and a chlorination degree of 67% were added 6 parts of an MBS resin (Kaneace B-22 available from Kaneka Corporation), 3 parts of chlorinated polyethylene (Tylyn 3615P available from DuPont Dow Elastomers Japan), 3 parts of butyltin mercaptide stabilizer, 0.5 part of butyltin mercaptopropionate stabilizer, 1 part of an oxidization-type modified polyethylene wax (Hiwax 220MP available from

TABLE 2

| Com. Ex. No. | | 1 | | 2 | |
|---|---|---|---|---|---|
| Composition of substrate (part) | Vinyl chloride resin (Polymerization degree: 1000) | 100 | H727 | 100 | |
|  | Acrylic impact resistance modifier | 6 | B22 | 6 | |
|  | Acrylic processing aid | 1 | Tylyn 3615P | 3 | |
|  | Methyltin mercaptide stabilizer | 1 | Butyltin mercaptide stabilizer | 3 | |
|  |  |  | Butyltin mercapto propionate stabilizer | 0.5 | |
|  | Calcium stearate | 1 | Hiwax 220MP | 1 | |
|  | Paraffin wax | 1 | AC629A | 1 | |
|  | Titanium oxide | 1 | Titanium oxide | 3.5 | |
|  | Calcium carbonate | 10 |  |  | |
| Evaluation result | Appearance of siding sheet | excellent |  | excellent | |
|  | Gardner impact test (m · kg/mm (inch · lbs/mil)) | 0.626 (1.38) |  | 0.784 (1.73) | |
|  | Sunshine weatherability test | B |  | C | |
|  | Oil canning test | not passed |  | passed | |
|  | HDT test (° C.(° F.)) | about 71.7 (161) |  | about 91.7 (197) | |

As apparent from the results of Examples 1 to 5, when a resin composition containing a chlorinated vinyl chloride resin and an acrylic graft rubber copolymer is used, there can be obtained a siding molded article having good appearance and excellent heat resistance, weatherability and impact resistance without losing processibility. Therefore, the industrial value of the present invention is remarkably great.

What is claimed is:

1. A chlorinated vinyl chloride resin composition for siding extrusion molding, comprising 100 parts by weight of a chlorinated vinyl chloride resin and 3 to 20 parts by weight of an acrylic graft rubber copolymer, wherein the acrylic graft rubber copolymer contains 30 to 90% by weight of acrylic hollow rubber particles whose average void ratio is 3 to 90% by volume in a latex state.

2. The chlorinated vinyl chloride resin composition of claim 1, further comprising at least two tin stabilizers.

3. The chlorinated vinyl chloride resin composition of claim 1, further comprising, as a lubricant, oxidation-type modified polyethylene wax having acid number of 0.1 to 10 mg/g measured by JIS K 5902.

4. The chlorinated vinyl chloride resin composition of claim 1, further comprising a dark-color pigment.

5. A siding molded article obtained by using the chlorinated vinyl chloride resin composition for siding extrusion molding of claim 1.

6. The siding molded article of claim 5, wherein the siding molded article has Gardner strength of at least 0.680 m·kg/mm (1.5 inch·lbs/mil) at 23° C. and HDT of at least 87.7° C. (190° F.).

* * * * *